US012315417B2

(12) United States Patent
Baik et al.

(10) Patent No.: US 12,315,417 B2
(45) Date of Patent: May 27, 2025

(54) DISPLAY DEVICE AND METHOD OF DRIVING THE SAME

(71) Applicant: Samsung Display Co., LTD., Yongin-si (KR)

(72) Inventors: Jiyeon Baik, Yongin-si (KR); SeokJeong Song, Yongin-si (KR); Kyungsu Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/535,314

(22) Filed: Dec. 11, 2023

(65) Prior Publication Data

US 2024/0331606 A1 Oct. 3, 2024

(30) Foreign Application Priority Data

Mar. 30, 2023 (KR) ........................ 10-2023-0042361

(51) Int. Cl.
*G09G 3/20* (2006.01)
*G09G 3/3233* (2016.01)

(52) U.S. Cl.
CPC ......... *G09G 3/2074* (2013.01); *G09G 3/3233* (2013.01); *G09G 2300/0452* (2013.01); *G09G 2360/142* (2013.01); *G09G 2360/16* (2013.01)

(58) Field of Classification Search
CPC ................................................ G09G 2310/027
See application file for complete search history.

(56) References Cited

U.S. PATENT DOCUMENTS

2004/0036704 A1* 2/2004 Han ................ H04N 21/44008 348/E9.053
2008/0266330 A1* 10/2008 Park .................... G09G 3/3233 345/690
2013/0342585 A1* 12/2013 Chun .................. G09G 3/3208 345/690
2014/0176623 A1* 6/2014 Inoue .................. G09G 3/2003 345/690

FOREIGN PATENT DOCUMENTS

KR 10-2022-0058770 5/2022

* cited by examiner

*Primary Examiner* — Nan-Ying Yang
(74) *Attorney, Agent, or Firm* — KILE PARK REED & HOUTTEMAN PLLC

(57) ABSTRACT

A display device may include a display panel that includes pixels each displaying one of a red, a green, and a blue, a controller that generates an output grayscale value based on an input grayscale value, a remapped grayscale value corresponding to the input grayscale value, and a gain value calculated based on a measured luminance of the display panel corresponding to a specific grayscale, and a data driver that generates a data signal based on the output grayscale value and provides the data signal to each of the pixels.

18 Claims, 11 Drawing Sheets

FIG. 7

LUT

| GRAY_IN | GRAY_RE |
|---|---|
| 0 | X0 |
| 1 | X1 |
| 2 | X2 |
| ⋮ | ⋮ |
| 149 | X149 |
| 150 | 150 |
| 151 | 151 |
| ⋮ | ⋮ |
| 254 | 254 |
| 255 | 255 |

DISPLAY DEVICE AND METHOD OF DRIVING THE SAME

CROSS-REFERENCE TO RELATED APPLICATION(S)

This application claims priority to and benefits of Korean Patent Application No. 10-2023-0042361 under 35 U.S.C. § 119, filed on Mar. 30, 2023, in the Korean Intellectual Property Office (KIPO), the entire disclosure of which is incorporated herein by reference.

BACKGROUND

1. Technical Field

Embodiments relate to a display device. More particularly, embodiments related to a display device for improving display quality in a low-grayscale region and a method of driving the display device.

2. Description of the Related Art

A display device may include a display panel including pixels. Each of the pixels may display a color, e.g., one of red, green, and blue. The display panel may display an image based on light emitted from each of the pixels.

A luminance of light emitted from a pixel may decrease due to, e.g., lateral leakage between pixels through a common layer. Specifically, in case that a luminance decreases in a low-grayscale region (or low-luminance region) in which the luminance of light emitted from the pixel is low, the luminance decrease may be recognized by a user.

SUMMARY

Embodiments provide a display device in which a deviation in luminance between display panels in a low-grayscale region is improved and a method of driving the display device.

A display device according to embodiments may include a display panel that includes pixels each displaying one of a red, a green, and a blue, a controller that generates an output grayscale value based on an input grayscale value, a remapped grayscale value corresponding to the input grayscale value, and a gain value calculated based on a measured luminance of the display panel corresponding to a specific grayscale, and a data driver that generates a data signal based on the output grayscale value and provides the data signal to each of the pixels.

In an embodiment, the output grayscale value may be calculated by Equation 1:

$$\text{GRAY\_OUT} = \text{GRAY\_IN} + (\text{GRAY\_RE} - \text{GRAY\_IN}) \times GV \quad \text{[Equation 1]}$$

where the GRAY_OUT is the output grayscale value, the GRAY_IN is the input grayscale value, the GRAY_RE is the remapped grayscale value, and the GV is the gain value.

In an embodiment, the gain value may be calculated by dividing a target luminance corresponding to the specific grayscale by the measured luminance.

In an embodiment, the gain value may include a red gain value, a green gain value, and a blue gain value. The red gain value may be calculated by dividing a red target luminance corresponding to the specific grayscale by a red measured luminance of the display panel corresponding to the specific grayscale. The green gain value may be calculated by dividing a green target luminance corresponding to the specific grayscale by a green measured luminance of the display panel corresponding to the specific grayscale. The blue gain value may be calculated by dividing a blue target luminance corresponding to the specific grayscale by a blue measured luminance of the display panel corresponding to the specific grayscale.

In an embodiment, the red targe luminance, the green target luminance, and the blue target luminance may be calculated by Equation 2:

$$\begin{bmatrix} TLr \\ TLg \\ TLb \end{bmatrix} = \begin{bmatrix} r/(r+g+b) \\ g/(r+g+b) \\ b/(r+g+b) \end{bmatrix} \times TLw \quad \text{[Equation 2]}$$

where the TLr is the red target luminance, the TLg is the green target luminance, the TLb is the blue target luminance, the r is a red luminance ratio, the g is a green luminance ratio, the b is a blue luminance ratio, and the TLw is a white target luminance.

In an embodiment, the red luminance ratio, the green luminance ratio, and the blue luminance ratio may be calculated by Equation 3:

$$\begin{bmatrix} r \\ g \\ b \end{bmatrix} = \begin{bmatrix} Rx & Gx & Bx \\ Ry & Gy & By \\ Rz & Gz & Bz \end{bmatrix}^{-1} \times \begin{bmatrix} Wx \\ Wy \\ Wz \end{bmatrix} \quad \text{[Equation 3]}$$

where the Rx is a red measured luminance in an x-axis direction of the display panel corresponding to the specific grayscale, the Ry is a red measured luminance in a y-axis direction of the display panel corresponding to the specific grayscale, the Rz is a red measured luminance in a z-axis direction of the display panel corresponding to the specific grayscale, the Gx is a green measured luminance in the x-axis direction of the display panel corresponding to the specific grayscale, the Gy is a green measured luminance in the y-axis direction of the display panel corresponding to the specific grayscale, the Gz is a green measured luminance in the z-axis direction of the display panel corresponding to the specific grayscale, the Bx is a blue measured luminance in the x-axis direction of the display panel corresponding to the specific grayscale, the By is a blue measured luminance in the y-axis direction of the display panel corresponding to the specific grayscale, the Bz is a blue measured luminance in the z-axis direction of the display panel corresponding to the specific grayscale, the Wx is a white measured luminance in the x-axis direction of the display panel corresponding to the specific grayscale, the Wy is a white measured luminance in the y-axis direction of the display panel corresponding to the specific grayscale, and the Wz is a white measured luminance in the z-axis direction of the display panel corresponding to the specific grayscale.

In an embodiment, the gain value may include a first gain value calculated based on a first measured luminance of the display panel corresponding to a first grayscale and a second gain value calculated based on a second measured luminance of the display panel corresponding to a second grayscale higher than the first grayscale. The output grayscale value may be generated based on the first gain value in case that the input grayscale value is less than a third grayscale between the first grayscale and the second grayscale The output grayscale value may be generated based on the second gain value in case that the input grayscale value is greater than or substantially equal to the third grayscale.

In an embodiment, the gain value may include a first gain value calculated based on a first measured luminance of the display panel corresponding to a first dimming level and a second gain value calculated based on a second measured luminance of the display panel corresponding to a second dimming level higher than the first dimming level. The output grayscale value may be generated based on the first gain value in case that a set dimming level of the display panel is less than a third dimming level between the first dimming level and the second dimming level. The output grayscale value may be generated based on the second gain value in case that the set dimming level is greater than or substantially equal to the third dimming level.

In an embodiment, the gain value may include a first gain value calculated based on a first measured luminance of the display panel corresponding to a first frequency and a second gain value calculated based on a second measured luminance of the display panel corresponding to a second frequency higher than the first frequency. The output grayscale value may be generated based on the first gain value in case that a driving frequency of the display panel is less than a third frequency between the first frequency and the second frequency. The output grayscale value may be generated based on the second gain value in case that the driving frequency is greater than or substantially equal to the third frequency.

In an embodiment, a grayscale range of the remapped grayscale value may be included in a grayscale range of the input grayscale value.

A method of driving a display device that includes a display panel including pixels each displaying one of a red, a green, and a blue according to embodiments may include measuring a measured luminance of the display panel corresponding to a specific grayscale, calculating a gain value based on the measured luminance, generating an output grayscale value based on an input grayscale value, a remapped grayscale value corresponding to the input grayscale value, and the gain value, and providing a data signal generated based on the output grayscale value to each of the pixels.

In an embodiment, the output grayscale value may be calculated by Equation 1:

$$\mathrm{GRAY\_OUT} = \mathrm{GRAY\_IN} + (\mathrm{GRAY\_RE} - \mathrm{GRAY\_IN}) \times GV \quad \text{[Equation 1]}$$

where the GRAY_OUT is the output grayscale value, the GRAY_IN is the input grayscale value, the GRAY_RE is the remapped grayscale value, and the GV is the gain value.

In an embodiment, the gain value may be calculated by dividing a target luminance corresponding to the specific grayscale by the measured luminance.

In an embodiment, the gain value may include a red gain value, a green gain value, and a blue gain value. The red gain value may be calculated by dividing a red target luminance corresponding to the specific grayscale by a red measured luminance of the display panel corresponding to the specific grayscale. The green gain value may be calculated by dividing a green target luminance corresponding to the specific grayscale by a green measured luminance of the display panel corresponding to the specific grayscale. The blue gain value may be calculated by dividing a blue target luminance corresponding to the specific grayscale by a blue measured luminance of the display panel corresponding to the specific grayscale.

In an embodiment, the red targe luminance, the green target luminance, and the blue target luminance may be calculated by Equation 2:

$$\begin{bmatrix} TLr \\ TLg \\ TLb \end{bmatrix} = \begin{bmatrix} r/(r+g+b) \\ g/(r+g+b) \\ b/(r+g+b) \end{bmatrix} \times TLw \quad \text{[Equation 2]}$$

where the TLr is the red target luminance, the TLg is the green target luminance, the TLb is the blue target luminance, the r is a red luminance ratio, the g is a green luminance ratio, the b is a blue luminance ratio, and the TLw is a white target luminance.

In an embodiment, the red luminance ratio, the green luminance ratio, and the blue luminance ratio may be calculated by Equation 3:

$$\begin{bmatrix} r \\ g \\ b \end{bmatrix} = \begin{bmatrix} Rx & Gx & Bx \\ Ry & Gy & By \\ Rz & Gz & Bz \end{bmatrix}^{-1} \times \begin{bmatrix} Wx \\ Wy \\ Wz \end{bmatrix} \quad \text{[Equation 3]}$$

where the Rx is a red measured luminance in an x-axis direction of the display panel corresponding to the specific grayscale, the Ry is a red measured luminance in a y-axis direction of the display panel corresponding to the specific grayscale, the Rz is a red measured luminance in a z-axis direction of the display panel corresponding to the specific grayscale, the Gx is a green measured luminance in the x-axis direction of the display panel corresponding to the specific grayscale, the Gy is a green measured luminance in the y-axis direction of the display panel corresponding to the specific grayscale, the Gz is a green measured luminance in the z-axis direction of the display panel corresponding to the specific grayscale, the Bx is a blue measured luminance in the x-axis direction of the display panel corresponding to the specific grayscale, the By is a blue measured luminance in the y-axis direction of the display panel corresponding to the specific grayscale, the Bz is a blue measured luminance in the z-axis direction of the display panel corresponding to the specific grayscale, the Wx is a white measured luminance in the x-axis direction of the display panel corresponding to the specific grayscale, the Wy is a white measured luminance in the y-axis direction of the display panel corresponding to the specific grayscale, and the Wz is a white measured luminance in the z-axis direction of the display panel corresponding to the specific grayscale.

In an embodiment, the gain value may include a first gain value calculated based on a first measured luminance of the display panel corresponding to a first grayscale and a second gain value calculated based on a second measured luminance of the display panel corresponding to a second grayscale higher than the first grayscale. The output grayscale value may be generated based on the first gain value in case that the input grayscale value is less than a third grayscale between the first grayscale and the second grayscale The output grayscale value may be generated based on the second gain value in case that the input grayscale value is greater than or substantially equal to the third grayscale.

In an embodiment, the gain value may include a first gain value calculated based on a first measured luminance of the display panel corresponding to a first dimming level and a second gain value calculated based on a second measured luminance of the display panel corresponding to a second dimming level higher than the first dimming level. The output grayscale value may be generated based on the first gain value in case that a set dimming level of the display panel is less than a third dimming level between the first dimming level and the second dimming level. The output grayscale value may be generated based on the second gain value in case that the set dimming level is greater than or substantially equal to the third dimming level.

In an embodiment, the gain value may include a first gain value calculated based on a first measured luminance of the display panel corresponding to a first frequency and a second gain value calculated based on a second measured luminance of the display panel corresponding to a second frequency higher than the first frequency. The output grayscale value may be generated based on the first gain value in case that a driving frequency of the display panel is less than a third frequency between the first frequency and the second frequency. The output grayscale value may be generated based on the second gain value in case that the driving frequency is greater than or substantially equal to the third frequency.

In an embodiment, a grayscale range of the remapped grayscale value may be included in a grayscale range of the input grayscale value.

A method of driving a display device which includes a display panel including pixels each displaying one of a red, a green, and a blue according to embodiments may include measuring a measured luminance of the display panel corresponding to a specific grayscale, calculating a gain value based on the measured luminance, generating an output grayscale value based on an input grayscale value, a remapped grayscale value corresponding to the input grayscale value, and the gain value, and providing a data signal generated based on the output grayscale value to each of the pixels.

In the display device and the method of driving the display device according to the embodiments, the output grayscale value may be generated based on the gain value calculated based on the measured luminance of the display panel corresponding to the specific grayscale, so that the deviation in luminance between the display panels in the low-grayscale region may decrease.

The technical objectives to be achieved by the disclosure are not limited to those described herein, and other technical objectives that are not mentioned herein would be clearly understood by a person skilled in the art from the description of the disclosure.

BRIEF DESCRIPTION OF THE DRAWINGS

Illustrative, non-limiting embodiments will be more clearly understood from the following detailed description taken in conjunction with the accompanying drawings.

FIG. 7 is a table illustrating a look-up table stored in a memory of the controller in FIG. 6.

DETAILED DESCRIPTION OF THE EMBODIMENTS

Figure 1:
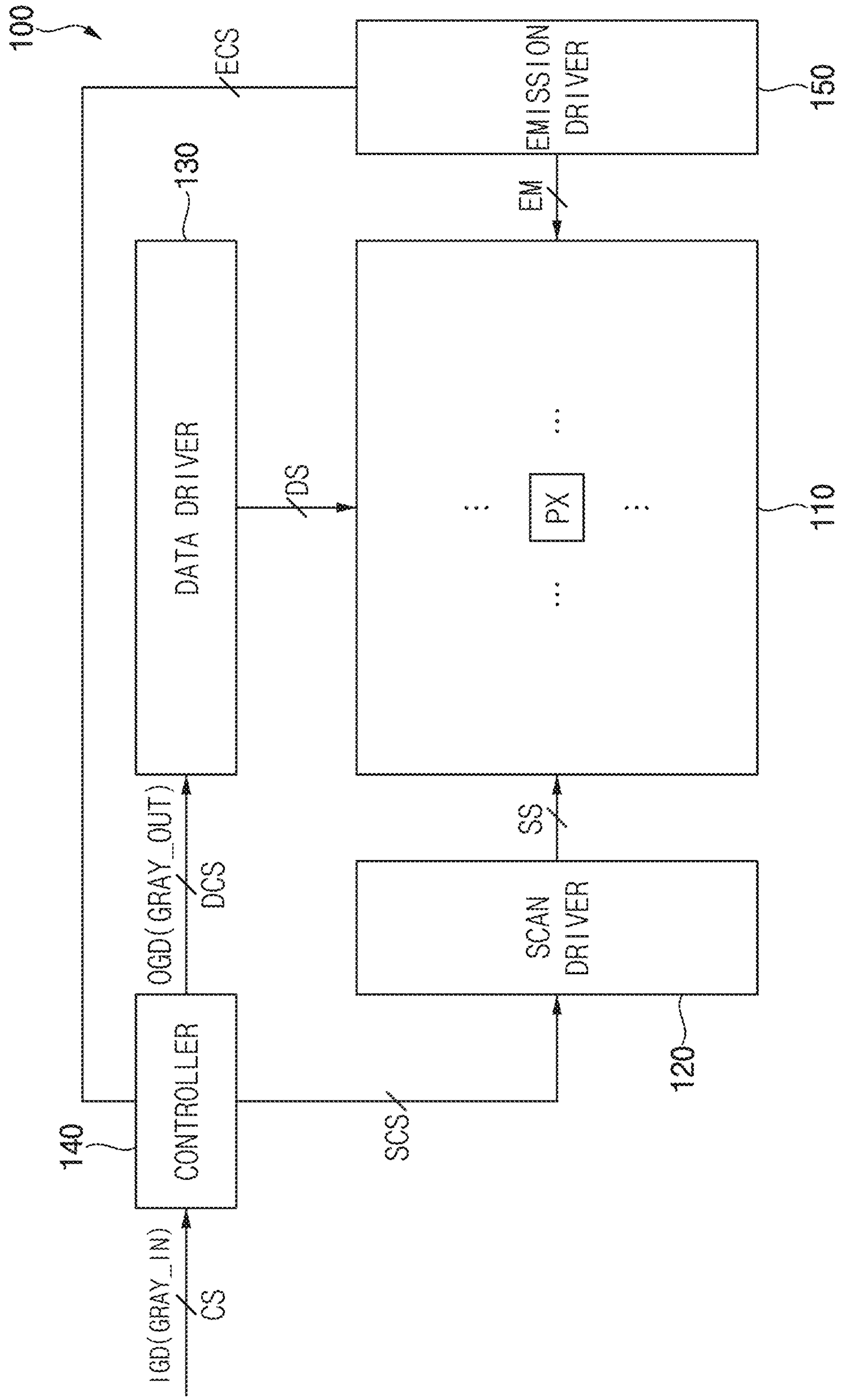
FIG. 1 is a schematic block diagram illustrating a display device according to an embodiment.

Hereinafter, a display device and a method of driving a display device according to embodiments of the disclosure will be described in more detail with reference to the accompanying drawings. The same or similar reference numerals will be used for the same elements in the accompanying drawings.

When an element is referred to as being "on," "connected to," or "coupled to" another element, it may be directly on, connected to, or coupled to the other element or intervening elements or layers may be present. When, however, an element is referred to as being "directly on," "directly connected to," or "directly coupled to" another element, there are no intervening elements or layers present. To this end, the term "connected" may refer to physical, electrical, and/or fluid connection, with or without intervening elements.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 2:
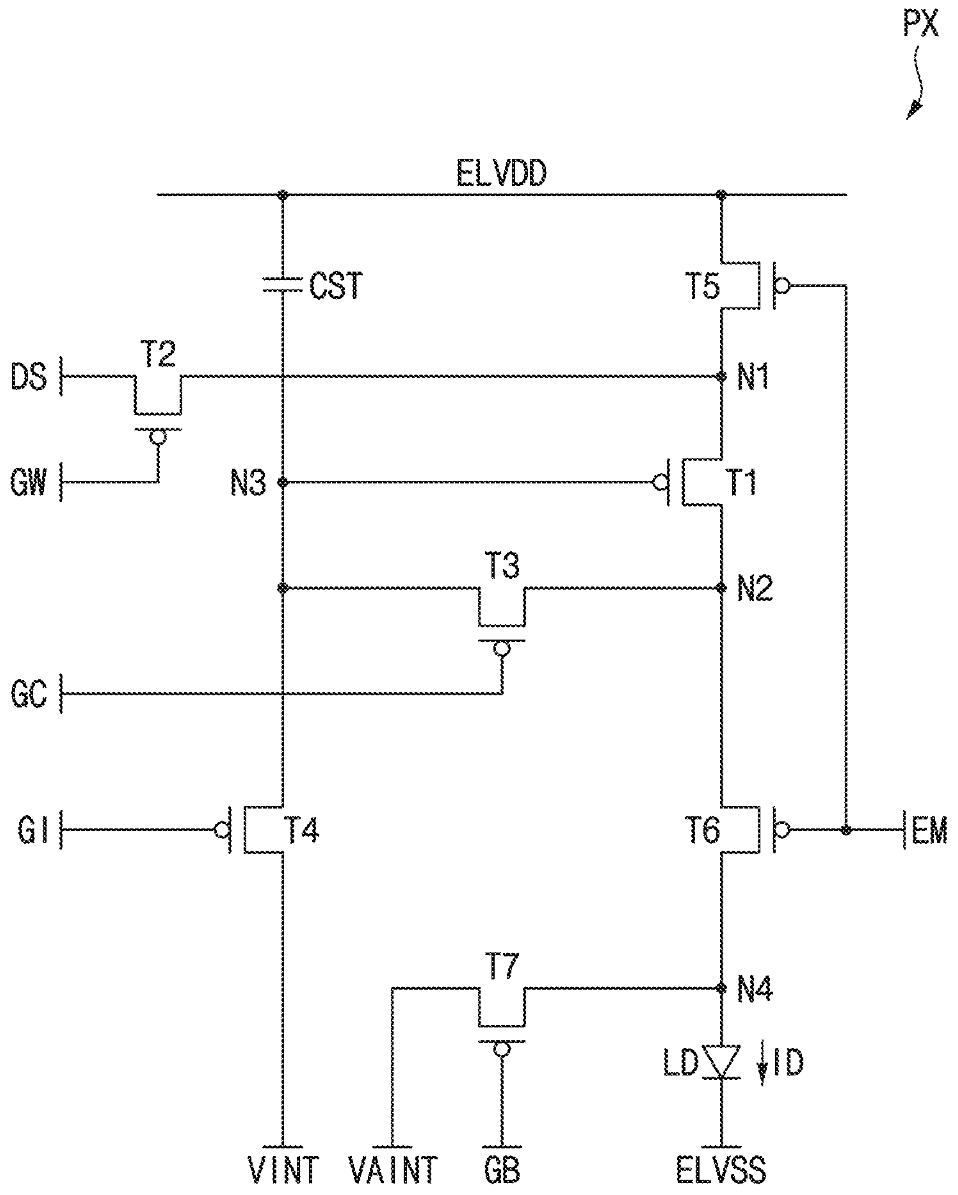
FIG. 2 is a schematic diagram of an equivalent circuit illustrating a pixel included in the display device in FIG. 1.

FIG. 1 is a schematic block diagram illustrating a display device 100 according to an embodiment. FIG. 2 is a schematic diagram of an equivalent circuit illustrating a pixel PX included in the display device 100 in FIG. 1.

Referring to FIGS. 1 and 2, the display device 100 may include a display panel 110, a scan driver 120, a data driver 130, and/or a controller 140. In an embodiment, the display device 100 may further include an emission driver 150.

The display panel 110 may include multiple pixels PX. Each of the pixels PX may display a color, e.g., one of red, green, and blue. In other words, the pixels PX may include red pixels displaying red, green pixels displaying green, and blue pixels displaying blue.

Each of the pixels PX may include a first transistor (or driving transistor) T1, a second transistor (or write transistor) T2, a third transistor (or compensation transistor) T3, a fourth transistor (or initialization transistor) T4, a fifth transistor (or first emission transistor) T5, a sixth transistor (or second emission transistor) T6, a seventh transistor (or bypass transistor) T7, a storage capacitor CST, and a light emitting diode LD.

The first transistor T1 may include a first electrode connected to a first node N1, a second electrode connected to a second node N2, and a gate electrode connected to a third electrode N3. The first transistor T1 may generate a driving current ID based on a voltage between the first node N1 and the third node N3.

The second transistor T2 may include a first electrode receiving a data signal DS, a second electrode connected to the first node N1, and a gate electrode receiving a first gate signal GW. The second transistor T2 may transmit the data signal DS to the first node N1 in response to the first gate signal GW.

The third transistor T3 may include a first electrode connected to the second node N2, a second electrode connected to the third node N3, and a gate electrode receiving a second gate signal GC. The third transistor T3 may connect the second node N2 and the third node N3 in response to the second gate signal GC. Accordingly, the data signal DS in which a threshold voltage of the first transistor T1 is reflected may be written to the third node N3.

The fourth transistor T4 may include a first electrode receiving a first initialization voltage VINT, a second electrode connected to the third node N3, and a gate electrode receiving a third gate signal GI. The fourth transistor T4 may transmit the first initialization voltage VINT to the third node N3 in response to the third gate signal GI. The first initialization voltage VINT may be lower than a voltage of the data signal DS. In case that the fourth transistor T4 is turned on, a current may flow from the third node N3 through the fourth transistor T4, and thus a voltage of the third node N3 may be initialized.

The fifth transistor T5 may include a first electrode receiving a first driving voltage ELVDD, a second electrode connected to the first node N1, and a gate electrode receiving an emission signal EM. The fifth transistor T5 may transmit the first driving voltage ELVDD to the first node N1 in response to the emission signal EM.

The sixth transistor T6 may include a first electrode connected to the second node N2, a second electrode connected to a fourth node N4, and a gate electrode receiving the emission signal EM. The sixth transistor T6 may connect the second node N2 and the fourth node N4 in response to the emission signal EM.

The seventh transistor T7 may include a first electrode receiving a second initialization voltage VAINT, a second electrode connected to the fourth node N4, and a gate electrode receiving a fourth gate signal GB. The seventh transistor T7 may transmit the second initialization voltage VAINT to the fourth node N4 in response to the fourth gate signal GB. The second initialization voltage VAINT may be lower than a second driving voltage ELVSS. In case that the seventh transistor T7 is turned on, a current may flow from the fourth node N4 through the seventh transistor T7, and thus a voltage of the fourth node N4 may be initialized.

FIG. 2 illustrates an embodiment in which each of the first transistor T1, the second transistor T2, the third transistor T3, the fourth transistor T4, the fifth transistor T5, the sixth transistor T6, and the seventh transistor T7 is a P-type transistor (e.g., a PMOS transistor), but the disclosure is not limited thereto. In another embodiment, at least one of the first transistor T1, the second transistor T2, the third transistor T3, the fourth transistor T4, the fifth transistor T5, the sixth transistor T6, and the seventh transistor T7 may be an N-type transistor (e.g., an NMOS transistor).

The storage capacitor CST may include a first electrode connected to the third node N3 and a second electrode receiving the first driving voltage ELVDD. The storage capacitor CST may maintain the voltage of the third node N3.

FIG. 2 illustrates an embodiment in which the pixel PX includes seven (7) transistors and one (1) capacitor, but the disclosure is not limited thereto. In another embodiment, the pixel PX may include two (2) to six (6) or eight (8) or more transistors and/or two (2) or more capacitors.

The light emitting diode LD may include a first electrode (or anode) connected to the fourth node N4 and a second electrode (or cathode) receiving the second driving voltage ELVSS. The light emitting diode LD may emit light having a luminance corresponding to the driving current ID. The second driving voltage ELVSS may be lower than the first driving voltage ELVDD.

In an embodiment, the light emitting diode LD may be an organic light emitting diode. However, the disclosure is not limited thereto, and in another embodiment, the light emitting diode LD may be a quantum-dot light emitting diode, an inorganic light emitting diode, or the like.

The scan driver 120 may provide a scan signal SS to each of the pixels PX. The scan signal SS may include the first gate signal GW, the second gate signal GC, the third gate signal GI, and/or the fourth gate signal GB. The scan driver 120 may generate scan signals SS based on a scan control signal SCS. The scan control signal SCS may include a scan start signal, a scan clock signal, or the like.

The data driver 130 may provide the data signal DS to each of the pixels PX. The data driver 130 may generate data signals DS based on output grayscale data OGD and a data control signal DCS. The output grayscale data OGD may include output grayscale values GRAY_OUT. The data control signal DCS may include a data enable signal, a data clock signal, or the like.

The emission driver 150 may provide the emission signal EM to each of the pixels PX. The emission driver 150 may generate emission signals EM based on an emission control signal ECS. The emission control signal ECS may include an emission start signal, an emission clock signal, or the like.

The controller 140 may control driving (or operation) of the scan driver 120, driving (or operation) of the data driver 130, and/or driving (or operation) of the emission driver 150. The controller 140 may provide the scan control signal SCS to the scan driver 120, may provide the output grayscale data OGD and the data control signal DCS to the data driver 130, and/or may provide the emission control signal ECS to the emission driver 150. The controller 140 may generate the output grayscale data OGD, the scan control signal SCS, the data control signal DCS, and/or the emission control signal ECS based on input grayscale data IGD and a control signal CS. The input grayscale data IGD may include input grayscale values GRAY_IN. The control signal CS may include a horizontal start signal, a vertical start signal, a global clock signal, or the like.

The controller 140 may generate the output grayscale value GRAY_OUT based on the input grayscale value GRAY_IN, a remapped grayscale value corresponding to the input grayscale value GRAY_IN, and a gain value calculated based on a measured luminance of the display panel 110 corresponding to a specific grayscale. The controller 140 may generate the output grayscale value GRAY_OUT by compensating the input grayscale value GRAY_IN based on the gain value, so that a deviation in luminance between display panels in a low-grayscale region may decrease.

Figure 3:
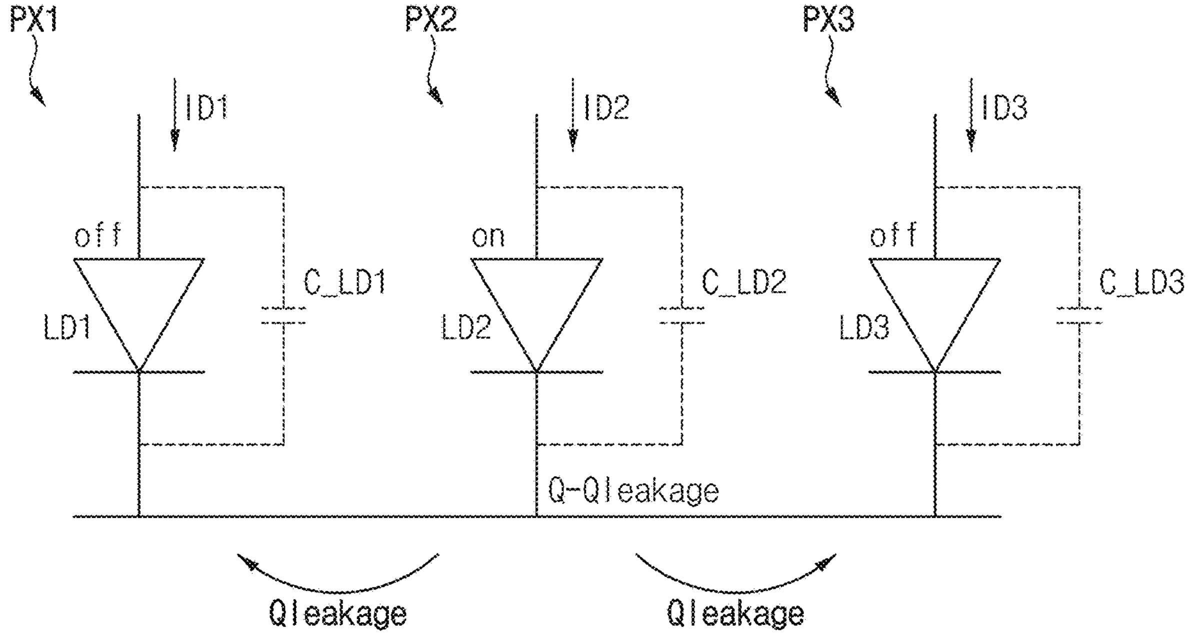
FIG. 3 is a schematic diagram for describing lateral leakage between pixels included in the display device in FIG. 1.

FIG. 3 is a schematic diagram for describing lateral leakage between pixels PX1, PX2, and PX3 included in the display device 100 in FIG. 1.

Referring to FIG. 3, the display device 100 may include a first pixel PX1, a second pixel PX2, and a third pixel PX3 which are adjacent to each other. The first pixel PX1 may include a first light emitting diode LD1 emitting light based on a first driving current ID1, the second pixel PX2 may include a second light emitting diode LD2 emitting light based on a second driving current ID2, and the third pixel PX3 may include a third light emitting diode LD3 emitting light based on a third driving current ID3. In an embodiment, the first light emitting diode LD1 may emit light of a first color, the second light emitting diode LD2 may emit light of a second color different from the first color, and the third light emitting diode LD3 may emit light of a third color different from the first and second colors. For example, the first light emitting diode LD1 may emit red light, the second light emitting diode LD2 may emit green light, and the third light emitting diode LD3 may emit blue light. The first pixel PX1 may further include a first parasitic capacitor C_LD1 connected in parallel with the first light emitting diode LD1, the second pixel PX2 may further include a second parasitic capacitor C_LD2 connected in parallel with the second light emitting diode LD2, and the third pixel PX3 may further include a third parasitic capacitor C_LD3 connected in parallel with the third light emitting diode LD3.

In case that the driving current does not flow through each of the first pixel PX1 and the third pixel PX3 (for example, in case that each of the first driving current ID1 and the third driving current ID3 is 0), some of the second driving current ID2 flowing through the second PX2 may leak into the first pixel PX1 and/or the third pixel PX3 through a common layer (e.g., a hole injection layer, a hole transport layer, an electron transport layer, or an electron injection layer) of the first to third light emitting diodes LD1, LD2, and LD3. The leakage of some of the driving current may be referred to as lateral leakage. Some leakage of charges Q (Qleakage) stored in the second parasitic capacitor C_LD2 may leak into the first parasitic capacitor C_LD1 and/or the third parasitic capacitor C_LD3, and the second light emitting diode LD2 may emit light with a luminance lower than a desired luminance due to the reduced charges (Q-Qleakage) stored in the second parasitic capacitor C_LD2.

In case that the second driving current ID2 is large (e.g., in case that the luminance of the light emitted from the second light emitting diode LD2 is high), a luminance decrease rate of the light emitted from the second light emitting diode LD2 may be small, and a luminance decrease may not be recognized by a user. However, in case that the second driving current ID2 is small (e.g., in case that the luminance of the light emitted from the second light emitting diode LD2 is low), the luminance decrease rate of the light emitted from the second light emitting diode LD2 may be large, and the luminance decrease may be recognized by the user. In other words, in a low-current region (e.g., low-grayscale region or low-luminance region) in which the driving current is small, the luminance decrease of the pixel may be recognized by the user.

Figure 4:
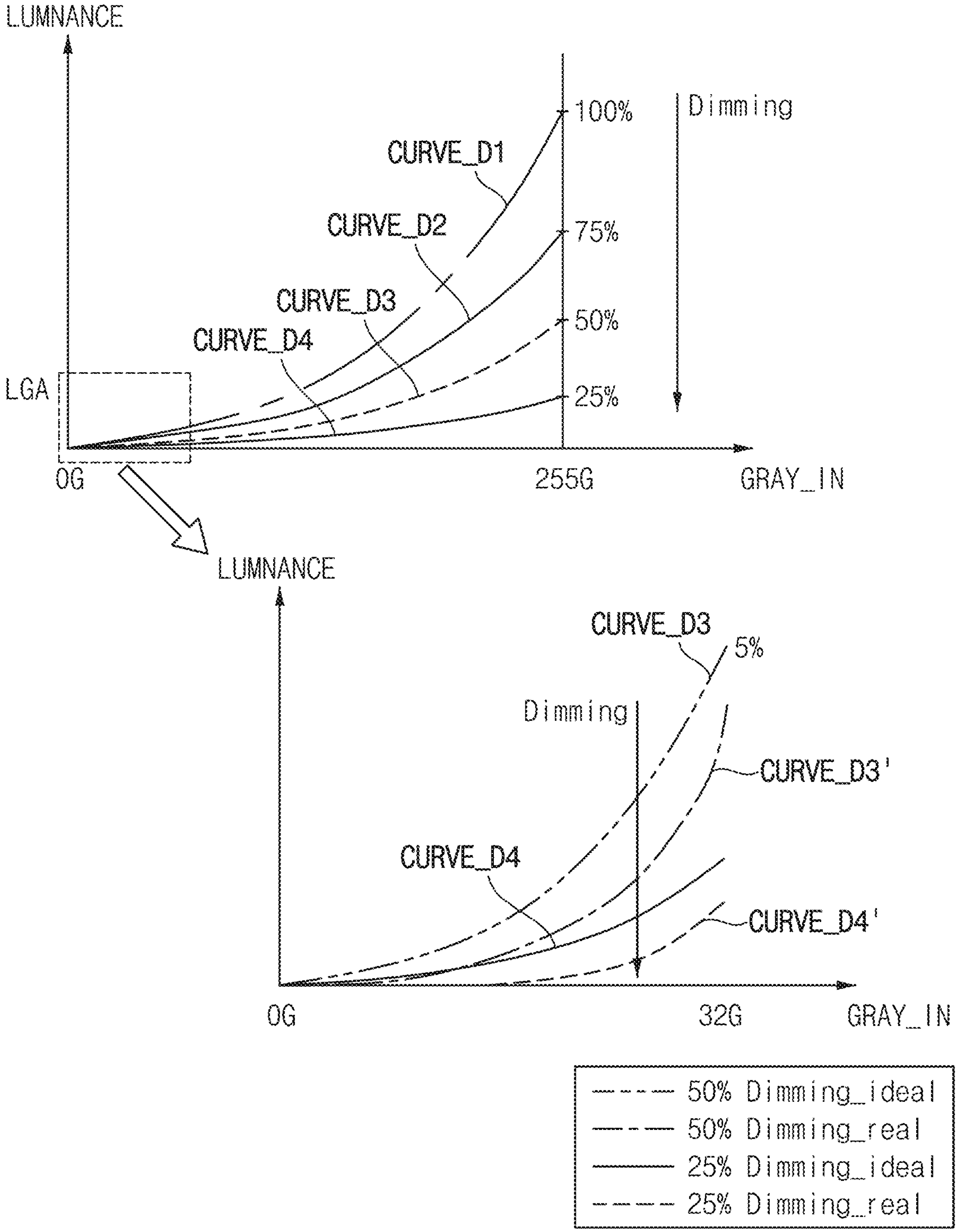
FIG. 4 is a schematic diagram for describing luminance decrease due to lateral leakage between pixels.

FIG. 4 is a schematic diagram for describing the luminance decrease due to the lateral leakage between pixels.

Referring to FIG. 4, each of a first gamma curve CURVE_D1, a second gamma curve CURVE_D2, a third gamma curve CURVE_D3, and a fourth gamma curve CURVE_D4 may represent luminance corresponding to the input grayscale value GRAY_IN. The first gamma curve CURVE_D1, the second gamma curve CURVE_D2, the third gamma curve CURVE_D3, and the fourth gamma curve CURVE_D4 may be gamma curves for each dimming level of the display panel 110. The second gamma curve CURVE_D2 may correspond to a dimming level lower than a dimming level of the first gamma curve CURVE_D1, the third gamma curve CURVE_D3 may correspond to a dimming level lower than the dimming level of the second gamma curve CURVE_D2, and the fourth gamma curve CURVE_D4 may correspond to a dimming level lower than the dimming level of the third gamma curve CURVE_D3. For example, the first gamma curve CURVE_D1, the second gamma curve CURVE_D2, the third gamma curve CURVE_D3, and the fourth gamma curve CURVE_D4 may correspond to an about 100% dimming level, an about 75% dimming level, an about 50% dimming level, and an about 25% dimming level, respectively. The dimming level may indicate a ratio of a luminance corresponding to a maximum input grayscale value to a maximum luminance of the display panel 110. As the dimming level increases, the luminance corresponding to the maximum input grayscale value may increase.

In the low-grayscale region LGA (for example, 0 grayscale (0G) to 32 grayscale (32G)) illustrated in FIG. 4, a third actual gamma curve CURVE_D3' having the about 50% dimming level may represent a lower luminance than the third gamma curve CURVE_D3 (e.g., an ideal gamma curve). Similarly, a fourth actual gamma curve CURVE_D4' having the about 25% dimming level may represent a lower luminance than the fourth gamma curve CURVE_D4 (i.e., an ideal gamma curve).

Accordingly, the controller 140 may remap the input grayscale value GRAY_IN such that a relationship between the input grayscale value GRAY_IN and the luminance changes from the actual gamma curve to the ideal gamma curve (in other words, to increase the luminance corresponding to the input grayscale value GRAY_IN).

Figure 5:
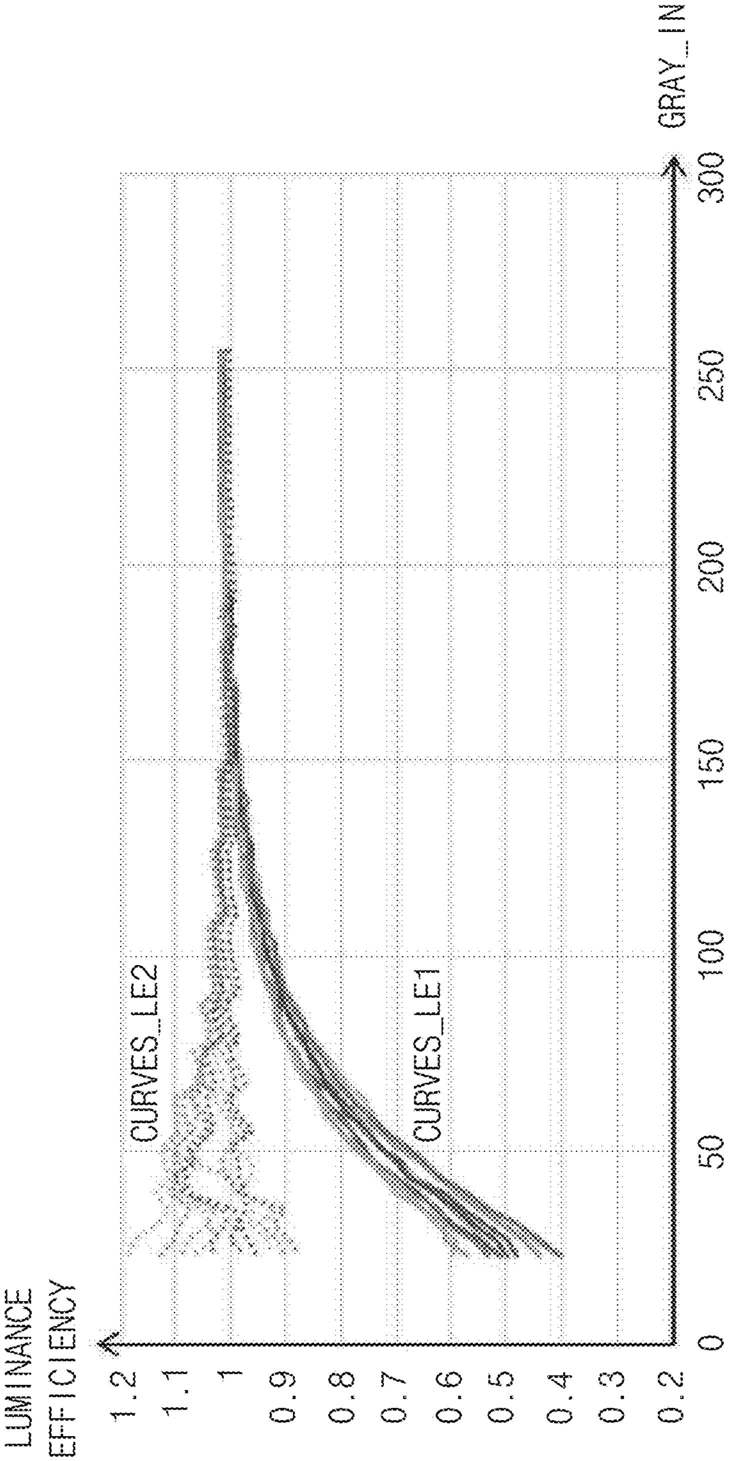
FIG. 5 is a schematic graph for describing a deviation in luminance between display panels displaying images based on an input grayscale value that is not compensated by a gain value.

FIG. 5 is a schematic graph for describing a deviation in luminance between display panels displaying images based on the input grayscale value GRAY_IN that is not compensated by the gain value.

Referring to FIG. 5, first efficiency curves CURVES_LE1 may represent luminance efficiencies of display panels corresponding to the input grayscale value GRAY_IN that is not remapped, and second efficiency curves CURVES_LE2 may represent luminance efficiencies of display panels corresponding to the input grayscale value GRAY_IN that is remapped. Here, the luminance efficiency may be a ratio of an actual measured luminance to a target luminance corresponding to the input grayscale value GRAY_IN. As the luminance efficiency is closer to about 1, the display panel may emit light with a luminance close to the target luminance. As the luminance efficiency is lower than about 1, the display panel may emit light with a luminance lower than the target luminance. As the luminance efficiency is higher than about 1, the display panel may emit light with a luminance higher than the target luminance. Luminance efficiencies of the first efficiency curves CURVES_LE1 may decrease as the input grayscale value GRAY_IN decreases due to a luminance decrease due to the lateral leakage between the pixels. In case that the input grayscale value GRAY_IN is remapped, the luminance corresponding to the input grayscale value GRAY_IN may increase in the low-grayscale region, and although the input grayscale value GRAY_IN decreases, luminance efficiencies of the second efficiency curves CURVES_LE2 may not decrease. Accordingly, in case that the input grayscale value GRAY_IN is remapped, the luminance decrease of the display panels in the low-grayscale region may be improved.

The input grayscale value GRAY_IN of each of the display panels may be remapped using a lookup table including the same parameter values. Accordingly, in case that the deviation in lateral leakage between the display panels is large, although the luminance decrease of the display panels in the low-grayscale region may be improved by remapping the input grayscale value GRAY_IN, but the deviation in luminance between the display panels in the low-grayscale region may increase. As illustrated in FIG. 5, the deviation in luminance efficiency (about 0.8 to about 1.2) between the second efficiency curves CURVES_LE2 in the low-grayscale region may be greater than the deviation in luminance efficiency (about 0.4 to about 0.6) between the first efficiency curves CURVES_LE1 in the low-grayscale region.

Accordingly, the controller 140 may compensate the input grayscale value GRAY_IN for each display panel such that the deviation in luminance efficiency between the display panels in the low-grayscale region decreases.

Figure 6:
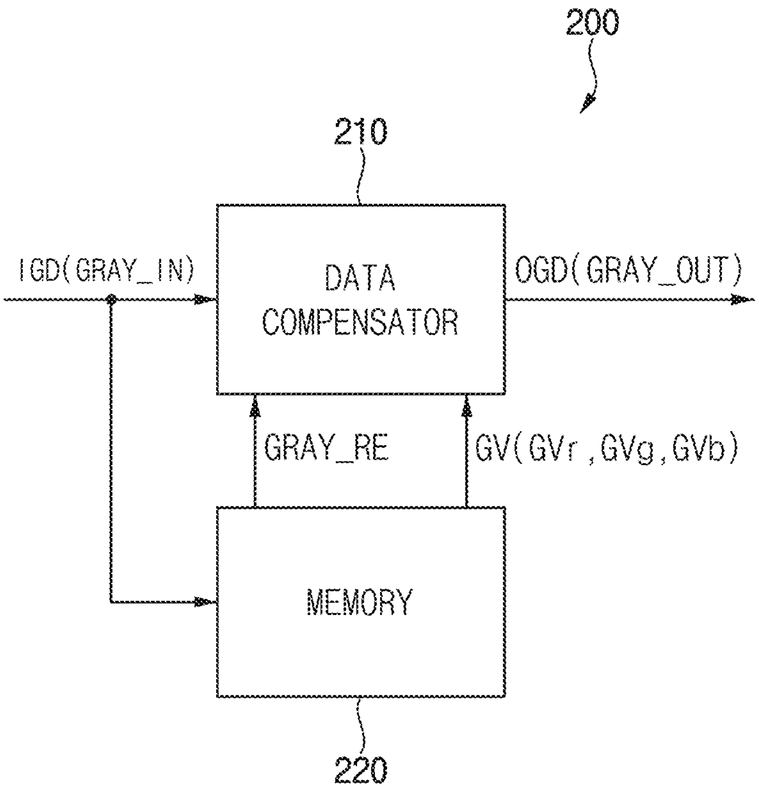
FIG. 6 is a schematic block diagram illustrating a controller according to an embodiment.

FIG. 6 is a schematic block diagram illustrating a controller 200 according to an embodiment. The controller 200 in FIG. 6 may be an example of the controller 140 included in the display device 100 in FIG. 1. FIG. 7 is a table illustrating a look-up table LUT stored in a memory 220 of the controller 200 in FIG. 6.

Referring to FIGS. 6 and 7, the controller 200 may include a data compensator 210 and a memory 220.

The memory 220 may store a lookup table LUT and the gain value GV. The memory 220 may remap the input grayscale value GRAY_IN to the remapped grayscale value GRAY_RE using the lookup table LUT. The memory 220 may provide the remapped grayscale value GRAY_RE and the gain value GV to the data compensator 210.

The lookup table LUT may include mapping information of the input grayscale value GRAY_IN and the remapped grayscale value GRAY_RE. A second grayscale range of the remapped grayscale value GRAY_RE may be included in a first grayscale range of the input grayscale value GRAY_IN. In an embodiment, the first grayscale range may include 0 to 255 grayscales, and the second grayscale range may include X0 to 255 grayscales. X0 grayscale may be greater than 0 grayscale, X1 grayscale may be greater than 1 grayscale, X2 grayscale may be greater than 2 grayscale, and X149 grayscale may be greater than 149 grayscale. Accordingly, the memory 220 may remap the input grayscale value GRAY_IN included in the low-grayscale region to the remapped grayscale value GRAY_RE greater than the input grayscale value GRAY_IN.

FIG. 7 illustrates an embodiment in which the low-grayscale region in which the remapped grayscale value GRAY_RE corresponding to the input grayscale value GRAY_IN is greater than the input grayscale value GRAY_IN is 0 to 149 grayscales, but the disclosure is not limited thereto. In another embodiment, the low-grayscale region may be 0 to n grayscales (n is a natural number equal to or greater than 1 and equal to or less than 255).

The gain value GV may be calculated by dividing a target luminance corresponding to a specific grayscale by a measured luminance of the display panel 110 corresponding to the specific grayscale. The target luminance may be a luminance of an image displayed by an ideal display panel 110 without lateral leakage based on the input grayscale data IGD including the input grayscale value GRAY_IN corresponding to the specific grayscale. The measured luminance may be a luminance obtained by measuring a luminance of an image displayed by the display panel 110 based on the input grayscale data IGD including the input grayscale value GRAY_IN corresponding to the specific grayscale using a luminance meter. For example, the specific grayscale may be 50 grayscale, and the target luminance may be 4 nits.

The gain value GV may include a red gain value GVr, a green gain value GVg, and a blue gain value GVb. The red gain value GVr may be calculated by dividing a red target luminance corresponding to the specific grayscale by a red measured luminance of the display panel 110 corresponding to the specific grayscale. The red target luminance may be a luminance of a red image displayed by the ideal display panel 110 without lateral leakage based on the input grayscale data IGD including a red input grayscale value corresponding to the specific grayscale. The red measured luminance may be a luminance obtained by measuring a luminance of a red image displayed by the display panel 110 based on the input grayscale data IGD including the red input grayscale value corresponding to the specific grayscale using the luminance meter.

The green gain value GVg may be calculated by dividing a green target luminance corresponding to the specific grayscale by a green measured luminance of the display panel 110 corresponding to the specific grayscale. The green target luminance may be a luminance of a green image displayed by the ideal display panel 110 without lateral leakage based on the input grayscale data IGD including a green input grayscale value corresponding to the specific grayscale. The green measured luminance may be a luminance obtained by measuring a luminance of a green image displayed by the display panel 110 based on the input grayscale data IGD including the green input grayscale value corresponding to the specific grayscale using the luminance meter.

The blue gain value GVb may be calculated by dividing a blue target luminance corresponding to the specific grayscale by a blue measured luminance of the display panel 110 corresponding to the specific grayscale. The blue target luminance may be a luminance of a blue image displayed by the ideal display panel 110 without lateral leakage based on the input grayscale data IGD including a blue input grayscale value corresponding to the specific grayscale. The blue measured luminance may be a luminance obtained by measuring a luminance of a blue image displayed by the display panel 110 based on the input grayscale data IGD including the blue input grayscale value corresponding to the specific grayscale using the luminance meter.

Each of the red target luminance TLr, the green target luminance TLg, and the blue target luminance TLb may be calculated based on a red luminance ratio r, a green luminance ratio g, a blue luminance ratio b, and a white target luminance TLw. The red target luminance TLr, the green target luminance TLg, and the blue target luminance TLb may be calculated by Equation 1.

$$\begin{bmatrix} TLr \\ TLg \\ TLb \end{bmatrix} = \begin{bmatrix} r/(r+g+b) \\ g/(r+g+b) \\ b/(r+g+b) \end{bmatrix} \times TLw \qquad \text{[Equation 1]}$$

The white target luminance TLw may be a luminance of a white image displayed by the ideal display panel 110 without lateral leakage based on the input grayscale data IGD including the red input grayscale value, the green input grayscale value, and the blue input grayscale value corresponding to the specific grayscale.

Each of the red luminance ratio r, the green luminance ratio g, and the blue luminance ratio b may be calculated based on a red measured luminance in an x-axis direction Rx of the display panel corresponding to the specific grayscale, a red measured luminance in a y-axis direction Ry of the display panel corresponding to the specific grayscale, a red measured luminance in a z-axis direction Rz of the display panel corresponding to the specific grayscale, a green measured luminance in the x-axis direction Gx of the display panel corresponding to the specific grayscale, a green measured luminance in the y-axis direction Gy of the display panel corresponding to the specific grayscale, a green measured luminance in the z-axis direction Gz of the display panel corresponding to the specific grayscale, a blue measured luminance in the x-axis direction Bx of the display panel corresponding to the specific grayscale, a blue measured luminance in the y-axis direction By of the display panel corresponding to the specific grayscale, a blue measured luminance in the z-axis direction Bz of the display panel corresponding to the specific grayscale, a white measured luminance in the x-axis direction Wx of the display panel corresponding to the specific grayscale, a white measured luminance in the y-axis direction Wy of the display panel corresponding to the specific grayscale, and a white measured luminance in the z-axis direction Wz of the display panel corresponding to the specific grayscale. The red luminance ratio r, the green luminance ratio g, and the blue luminance ratio b may be calculated by Equation 2.

$$\begin{bmatrix} r \\ g \\ b \end{bmatrix} = \begin{bmatrix} Rx & Gx & Bx \\ Ry & Gy & By \\ Rz & Gz & Bz \end{bmatrix}^{-1} \times \begin{bmatrix} Wx \\ Wy \\ Wz \end{bmatrix} \qquad \text{[Equation 2]}$$

The red measured luminance in the x-axis direction Rx, the red measured luminance in the y-axis direction Ry, the red measured luminance in the z-axis direction Rz, the green measured luminance in the x-axis direction Gx, the green measured luminance in the y-axis direction Gy, the green measured luminance in the z-axis direction Gz, the blue measured luminance in the x-axis direction Bx, the blue measured luminance in the y-axis direction By, the blue measured luminance in the z-axis direction Bz, the white measured luminance in the x-axis direction Wx, the white measured luminance in the y-axis direction Wy, and the white measured luminance in the z-axis direction Wz may be measured using the luminance meter.

The data compensator 210 may generate the output grayscale value GRAY_OUT based on the input grayscale value GRAY_IN, the remapped grayscale value GRAY_RE, and the gain value GV. The output grayscale value GRAY_OUT may be calculated by Equation 3.

$$\text{GRAY\_OUT} = \text{GRAY\_IN} + (\text{GRAY\_RE} - \text{GRAY\_IN}) \times GV \qquad \text{[Equation 3]}$$

The input grayscale value GRAY_IN may be one of a red input grayscale value, a green input grayscale value, and a blue input grayscale value. In case that the input grayscale value GRAY_IN is the red input grayscale value, the output grayscale value GRAY_OUT may be generated based on the input grayscale value GRAY_IN, the remapped grayscale value GRAY_RE, and the red gain value GVr. In case that the input grayscale value GRAY_IN is the green input grayscale value, the output grayscale value GRAY_OUT may be generated based on the input grayscale value GRAY_IN, the remapped grayscale value GRAY_RE, and the green gain value GVg. In case that the input grayscale value GRAY_IN is the blue input grayscale value, the output grayscale value GRAY_OUT may be generated based on the input grayscale value GRAY_IN, the remapped grayscale value GRAY_RE, and the blue gain value GVb.

Figure 8:
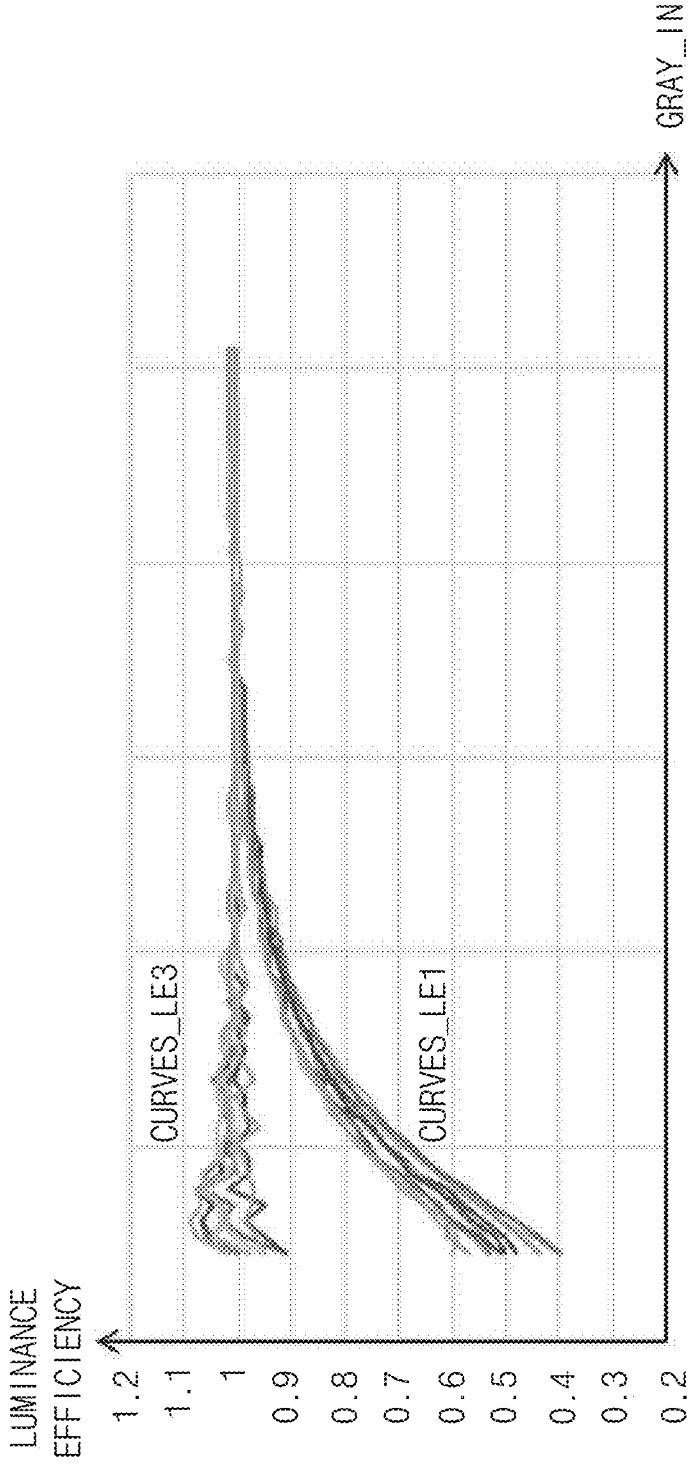
FIG. 8 is a schematic graph for describing a deviation in luminance between display panels displaying images based on an input grayscale value that is compensated by a gain value.

FIG. 8 is a graph for describing a deviation in luminance between display panels displaying images based on the input grayscale value GRAY_IN that is compensated by the gain value GV.

Referring to FIG. 8, third efficiency curves CURVES_LE3 may represent luminance efficiencies of display panels corresponding to the input grayscale value GRAY_IN that is remapped and compensated by the gain value GV. In embodiments, the output grayscale value GRAY_OUT may be generated by applying the same remapped grayscale value GRAY_RE for each display panel and the gain value GV calculated based on the different measured luminance for each display panel to the input grayscale value GRAY_IN, so that the input grayscale value GRAY_IN may be converted into the output grayscale value GRAY_OUT in consideration of different lateral leakage for each display panel. Accordingly, the deviation in luminance between the display panels in the low-grayscale region may decrease. As illustrated in FIGS. 5 and 8, the deviation in luminance efficiency (about 0.9 to about 1.1) between the third efficiency curves CURVES_LE3 in the low-grayscale region may be less than the deviation in luminance efficiency (about 0.8 to about 1.2) between the second efficiency curves CURVES_LE2 in the low-grayscale region.

Figure 9:
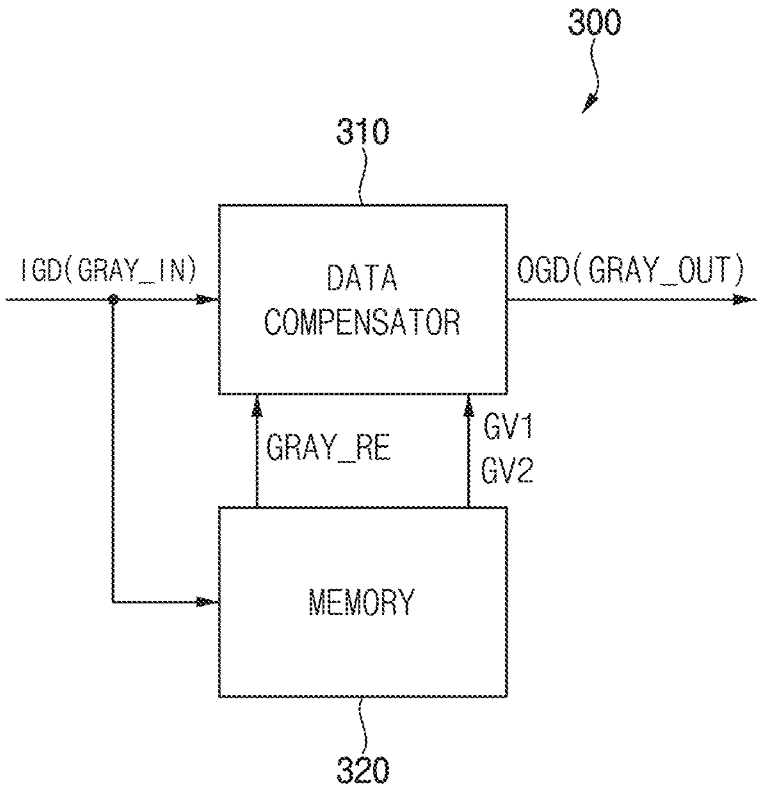
FIG. 9 is a schematic block diagram illustrating a controller according to an embodiment.

FIG. 9 is a schematic block diagram illustrating a controller 300 according to an embodiment. The controller 300 in FIG. 9 may be another example of the controller 140 included in the display device 100 of FIG. 1.

Referring to FIG. 9, the controller 300 may include a data compensator 310 and a memory 320. Descriptions of components of the controller 300 described with reference to FIG. 9, which are substantially the same as or similar to those of the controller 200 described with reference to FIGS. 6 and 7, will be omitted.

The memory 320 may store the lookup table LUT, a first gain value GV1, and a second gain value GV2. The memory 320 may provide the remapped grayscale value GRAY_RE, the first gain value GV1, and the second gain value GV2 to the data compensator 310.

In an embodiment, the first gain value GV1 may be calculated based on a first measured luminance of the display panel 110 corresponding to a first grayscale, and the second gain value GV2 may be calculated based on a second measured luminance of the display panel 110 corresponding to a second grayscale higher than the first grayscale. The first measured luminance may be a luminance obtained by measuring a luminance of an image displayed by the display panel 110 based on the input grayscale data IGD including the input grayscale value GRAY_IN corresponding to the first grayscale using the luminance meter. The second measured luminance may be a luminance obtained by measuring a luminance of an image displayed by the display panel 110 based on the input grayscale data IGD including the input grayscale value GRAY_IN corresponding to the second grayscale using the luminance meter. For example, the first grayscale may be 23 grayscale, and the second grayscale may be 50 grayscale.

In case that the input grayscale value GRAY_IN is less than a third grayscale between the first grayscale and the second grayscale, the data compensator 310 may generate the output grayscale value GRAY_OUT based on the input grayscale value GRAY_IN, the remapped grayscale value GRAY_RE, and the first gain value GV1. In case that the input grayscale value GRAY_IN is substantially equal to or greater than the third grayscale, the data compensator 310 may generate the output grayscale value GRAY_OUT based on the input grayscale value GRAY_IN, the remapped grayscale value GRAY_RE, and the second gain value GV2. For example, the third grayscale may be 49 grayscale. Accordingly, the input grayscale value GRAY_IN may be precisely compensated by selectively applying the first gain value GV1 or the second gain value GV2 according to the input grayscale value GRAY_IN, and the deviation in luminance between the display panels in the low-grayscale region may further decrease.

In another embodiment, the first gain value GV1 may be calculated based on a first measured luminance of the display panel 110 corresponding to a first dimming level, and the second gain value GV2 may be calculated based on a second measured luminance of the display panel 110 corresponding to a second dimming level higher than the first dimming level. The first measured luminance may be a luminance obtained by measuring a luminance of an image displayed by the display panel 110 set to the first dimming level using the luminance meter, and the second measured luminance may be a luminance obtained by measuring a luminance of an image displayed by the display panel 110 set to the second dimming level using the luminance meter. For example, the first dimming level may be an about 25% dimming level, and the second dimming level may be an about 50% dimming level.

In case that the set dimming level of the display panel 110 is less than a third dimming level between the first dimming level and the second dimming level, the data compensator 310 may generate the output grayscale value GRAY_OUT based on the input grayscale value GRAY_IN, the remapped grayscale value GRAY_RE, and the first gain value GV1. In case that the set dimming level of the display panel 110 is substantially equal to or greater than the third dimming level, the data compensator 310 may generate the output grayscale value GRAY_OUT based on the input grayscale value GRAY_IN, the remapped grayscale value GRAY_RE, and the second gain value GV2. Accordingly, the input grayscale value GRAY_IN may be precisely compensated by selectively applying the first gain value GV1 or the second gain value GV2 according to the set dimming level of the display panel 110, and the deviation in luminance between the display panels in the low-grayscale region may further decrease.

In still another embodiment, the first gain value GV1 may be calculated based on a first measured luminance of the display panel 110 corresponding to a first frequency, and the second gain value GV2 may be calculated based on a second measured luminance of the display panel 110 corresponding to a second frequency higher than the first frequency. The first measured luminance may be a luminance obtained by measuring a luminance of an image displayed by the display panel 110 driven at the first frequency using the luminance meter, and the second measured luminance may be a luminance obtained by measuring a luminance of an image displayed by the display panel 110 driven at the second frequency using the luminance meter. For example, the first frequency may be about 60 Hz, and the second frequency may be about 120 Hz.

In case that the driving frequency of the display panel 110 is less than a third frequency between the first frequency and the second frequency, the data compensator 310 may generate the output grayscale value GRAY_OUT based on the input grayscale value GRAY_IN, the remapped grayscale value GRAY_RE, and the first gain value GV1. In case that the driving frequency of the display panel 110 is substantially equal to or greater than the third frequency, the data compensator 310 may generate the output grayscale value GRAY_OUT based on the input grayscale value GRAY_IN, the remapped grayscale value GRAY_RE, and the second gain value GV2. Accordingly, the input grayscale value GRAY_IN may be precisely compensated by selectively applying the first gain value GV1 or the second gain value GV2 according to the set dimming level of the display panel 110, and the deviation in luminance between the display panels in the low-grayscale region may further decrease.

Figure 10:
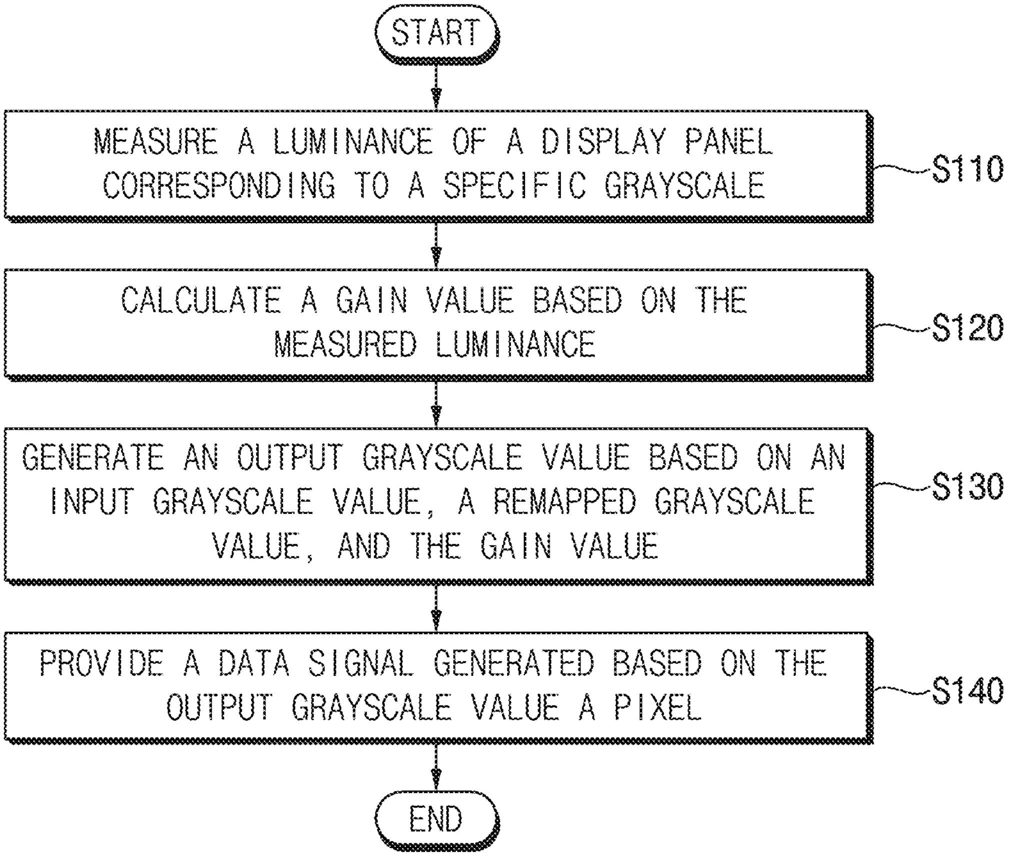
FIG. 10 is a schematic flowchart illustrating a method of driving a display device according to an embodiment.

FIG. 10 is a schematic flowchart illustrating a method of driving a display device 100 according to an embodiment.

Referring to FIGS. 1, 6, and 10, in the method of driving the display device 100, a luminance of a display panel 110 corresponding to a specific grayscale may be measured using a luminance meter (S110).

A gain value GV may be calculated based on the measured luminance (S120). The gain value GV may be calculated by dividing a target luminance corresponding to a specific grayscale by the measured luminance of the display panel 110 corresponding to the specific grayscale.

The gain value GV may include a red gain value GVr, a green gain value GVg, and/or a blue gain value GVb. The red gain value GVr may be calculated by dividing a red target luminance corresponding to the specific grayscale by a red measured luminance of the display panel 110 corresponding to the specific grayscale. The green gain value GVg may be calculated by dividing a green target luminance corresponding to the specific grayscale by the green measured luminance of the display panel 110 corresponding to the specific grayscale. The blue gain value GVb may be calculated by dividing a blue target luminance corresponding to the specific grayscale by the blue measured luminance of the display panel 110 corresponding to the specific grayscale.

The red target luminance TLr, the green target luminance TLg, and the blue target luminance TLb may be calculated based on a red luminance ratio r, a green luminance ratio g, a blue luminance ratio b, and a white target luminance TLw. The red target luminance TLr, the green target luminance TLg, and the blue target luminance TLb may be calculated by Equation 1.

$$\begin{bmatrix} TLr \\ TLg \\ TLb \end{bmatrix} = \begin{bmatrix} r/(r+g+b) \\ g/(r+g+b) \\ b/(r+g+b) \end{bmatrix} \times TLw \quad \text{[Equation 1]}$$

Each of the red luminance ratio r, the green luminance ratio g, and the blue luminance ratio b may be calculated based on a red measured luminance in an x-axis direction Rx of the display panel corresponding to the specific grayscale, a red measured luminance in a y-axis direction Ry of the display panel corresponding to the specific grayscale, a red measured luminance in a z-axis direction Rz of the display panel corresponding to the specific grayscale, a green measured luminance in the x-axis direction Gx of the display panel corresponding to the specific grayscale, a green measured luminance in the y-axis direction Gy of the display panel corresponding to the specific grayscale, a green measured luminance in the z-axis direction Gz of the display panel corresponding to the specific grayscale, a blue measured luminance in the x-axis direction Bx of the display panel corresponding to the specific grayscale, a blue measured luminance in the y-axis direction By of the display panel corresponding to the specific grayscale, a blue measured luminance in the z-axis direction Bz of the display panel corresponding to the specific grayscale, a white measured luminance in the x-axis direction Wx of the display panel corresponding to the specific grayscale, a white measured luminance in the y-axis direction Wy of the display panel corresponding to the specific grayscale, and a white measured luminance in the z-axis direction Wz of the display panel corresponding to the specific grayscale. The red luminance ratio r, the green luminance ratio g, and the blue luminance ratio b may be calculated by Equation 2.

$$\begin{bmatrix} r \\ g \\ b \end{bmatrix} = \begin{bmatrix} Rx & Gx & Bx \\ Ry & Gy & By \\ Rz & Gz & Bz \end{bmatrix}^{-1} \times \begin{bmatrix} Wx \\ Wy \\ Wz \end{bmatrix} \quad \text{[Equation 2]}$$

The controller 140 may calculate the output grayscale value GRAY_OUT based on the input grayscale value GRAY_IN, the remapped grayscale value GRAY_RE corresponding to the input grayscale value GRAY_IN, and the gain value GV (S130). The output grayscale value GRAY_OUT may be calculated by Equation 3.

$$GRAY\_OUT = GRAY\_IN + (GRAY\_RE - GRAY\_IN) \times GV \quad \text{[Equation 3]}$$

The input grayscale value GRAY_IN may be one of a red input grayscale value, a green input grayscale value, and a blue input grayscale value. In case that the input grayscale value GRAY_IN is the red input grayscale value, the output grayscale value GRAY_OUT may be generated based on the input grayscale value GRAY_IN, the remapped grayscale value GRAY_RE, and the red gain value GVr. In case that the input grayscale value GRAY_IN is the green input grayscale value, the output grayscale value GRAY_OUT may be generated based on the input grayscale value GRAY_IN, the remapped grayscale value GRAY_RE, and the green gain value GVg. In case that the input grayscale value GRAY_IN is the blue input grayscale value, the output grayscale value GRAY_OUT may be generated based on the input grayscale value GRAY_IN, the remapped grayscale value GRAY_RE, and the blue gain value GVb.

Referring to FIGS. 1 and 9, in embodiments, the gain value GV may include a first gain value GV1 and a second gain value GV2.

In an embodiment, the first gain value GV1 may be calculated based on a first measured luminance of the display panel 110 corresponding to a first grayscale, and the second gain value GV2 may be calculated based on a second measured luminance of the display panel 110 corresponding to a second grayscale higher than the first grayscale. In case that the input grayscale value GRAY_IN is less than a third grayscale between the first grayscale and the second grayscale, the data compensator 310 may generate the output grayscale value GRAY_OUT based on the input grayscale value GRAY_IN, the remapped grayscale value GRAY_RE, and the first gain value GV1. In case that the input grayscale value GRAY_IN is substantially equal to or greater than the third grayscale, the data compensator 310 may generate the output grayscale value GRAY_OUT based on the input grayscale value GRAY_IN, the remapped grayscale value GRAY_RE, and the second gain value GV2.

In another embodiment, the first gain value GV1 may be calculated based on a first measured luminance of the display panel 110 corresponding to a first dimming level, and the second gain value GV2 may be calculated based on a second measured luminance of the display panel 110 corresponding to a second dimming level higher than the first dimming level. In case that the set dimming level of the display panel 110 is less than a third dimming level between the first dimming level and the second dimming level, the data compensator 310 may generate the output grayscale value GRAY_OUT based on the input grayscale value GRAY_IN, the remapped grayscale value GRAY_RE, and the first gain value GV1. In case that the set dimming level of the display panel 110 is substantially equal to or greater than the third dimming level, the data compensator 310 may generate the output grayscale value GRAY_OUT based on the input grayscale value GRAY_IN, the remapped grayscale value GRAY_RE, and the second gain value GV2.

In still another embodiment, the first gain value GV1 may be calculated based on a first measured luminance of the display panel 110 corresponding to a first frequency, and the second gain value GV2 may be calculated based on a second measured luminance of the display panel 110 corresponding to a second frequency higher than the first frequency. In case that the driving frequency of the display panel 110 is less than a third frequency between the first frequency and the second frequency, the data compensator 310 may generate the output grayscale value GRAY_OUT based on the input grayscale value GRAY_IN, the remapped grayscale value GRAY_RE, and the first gain value GV1. In case that the driving frequency of the display panel 110 is substantially equal to or greater than the third frequency, the data compensator 310 may generate the output grayscale value GRAY_OUT based on the input grayscale value GRAY_IN, the remapped grayscale value GRAY_RE, and the second gain value GV2.

Referring to FIGS. 1 and 10, the data driver 130 may provide a data signal DS generated based on the output grayscale value GRAY_OUT to a pixel PX (S140).

Figure 11:
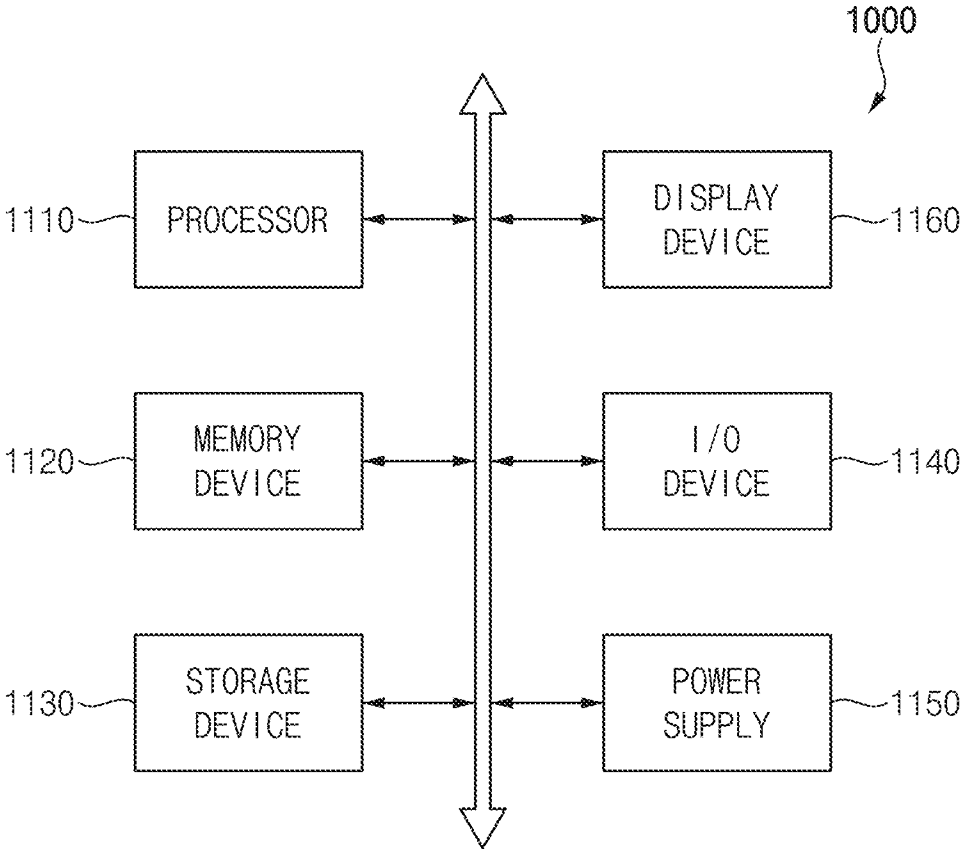
FIG. 11 is a schematic block diagram illustrating an electronic apparatus including a display device according to an embodiment.

FIG. 11 is a schematic block diagram illustrating an electronic apparatus 1000 including a display device 1160 according to an embodiment.

Referring to FIG. 11, the electronic apparatus 1000 may include a processor 1110, a memory device 1120, a storage device 1130, an input/output ("I/O") device 1140, a power supply 1150, and/or the display device 1160. The display device 1160 may correspond to the display device 100 in FIG. 1. The electronic apparatus 1000 may further include ports for communicating with a video card, a sound card, a memory card, a universal serial bus ("USB") device, etc.

The processor 1110 may perform calculations or tasks. In an embodiment, the processor 1110 may be a microprocessor, a central processing unit ("CPU"), or the like. The processor 1110 may be at least one processor, with some of the at least one processor, separately or in combination, being configured to perform one or more operations. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1000. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid-state drive ("SSD") device, a hard disk drive ("HDD") device, a CD-ROM device, or the like. The I/O device 1140 may include an input device such as a keyboard, a keypad, a touchpad, a touchscreen, a mouse device, etc., and an output device such as a speaker, a printer, etc. The power supply 1150 may supply a power required for the operation of the electronic apparatus 1000. The display device 1160 may be coupled to other components via the buses or other communication links.

In the display device 1160, an output grayscale value may be generated based on a gain value calculated based on a measured luminance of a display panel corresponding to a specific grayscale, so that a deviation in luminance between display panels in a low-grayscale region may decrease. Embodiments in which the controller 200/300 includes the data compensator 210/310 and the memory 220/320 are described with reference to FIGS. 1 to 10, however, the disclosure is not limited thereto. In other embodiments, the processor 1110 may include the data compensator 210/310 and the memory 220/320, and in this case, the output grayscale data OGD may be provided to the controller 140 instead of the input grayscale data IGD.

The display device according to the embodiments may be applied to a display device included in a computer, a notebook, a mobile phone, a smart phone, a smart pad, a PMP, a PDA, an MP3 player, or the like.

The above description is an example of technical features of the disclosure, and those skilled in the art to which the disclosure pertains will be able to make various modifications and variations. Thus, the embodiments of the disclosure described above may be implemented separately or in combination with each other.

The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device, comprising:

a display panel that includes pixels each displaying one of a red, a green, and a blue;

a controller that generates an output grayscale value based on an input grayscale value, a remapped grayscale value corresponding to the input grayscale value, and a gain value calculated based on a measured luminance of the display panel corresponding to a specific grayscale; and a data driver that generates a data signal based on the output grayscale value and provides the data signal to each of the pixels, wherein the output grayscale value is calculated by Equation 1:

$$\text{GRAY\_OUT} = \text{GRAY\_IN} + (\text{GRAY\_RE} - \text{GRAY\_IN}) \times GV \quad \text{[Equation 1]}$$

where the GRAY_OUT is the output grayscale value, the GRAY_IN is the input grayscale value, the GRAY_RE is the remapped grayscale value, and the GV is the gain value, and a grayscale range of the remapped grayscale value is included in a grayscale range of the input grayscale value.

2. The display device of claim 1, wherein the gain value is calculated by dividing a target luminance corresponding to the specific grayscale by the measured luminance.

3. The display device of claim 1, wherein the gain value includes a red gain value, a green gain value, and a blue gain value, the red gain value is calculated by dividing a red target luminance corresponding to the specific grayscale by a red measured luminance of the display panel corresponding to the specific grayscale, the green gain value is calculated by dividing a green target luminance corresponding to the specific grayscale by a green measured luminance of the display panel corresponding to the specific grayscale, and the blue gain value is calculated by dividing a blue target luminance corresponding to the specific grayscale by a blue measured luminance of the display panel corresponding to the specific grayscale.

4. The display device of claim 3, wherein the red targe luminance, the green target luminance, and the blue target luminance are calculated by Equation 2:

$$\begin{bmatrix} TLr \\ TLg \\ TLb \end{bmatrix} = \begin{bmatrix} r/(r+g+b) \\ g/(r+g+b) \\ b/(r+g+b) \end{bmatrix} \times TLw \quad \text{[Equation 2]}$$

where the TLr is the red target luminance, the TLg is the green target luminance, the TLb is the blue target luminance, the r is a red luminance ratio, the g is a green luminance ratio, the b is a blue luminance ratio, and the TLw is a white target luminance.

5. The display device of claim 4, wherein the red luminance ratio, the green luminance ratio, and the blue luminance ratio are calculated by Equation 3:

$$\begin{bmatrix} r \\ g \\ b \end{bmatrix} = \begin{bmatrix} Rx & Gx & Bx \\ Ry & Gy & By \\ Rz & Gz & Bz \end{bmatrix}^{-1} \times \begin{bmatrix} Wx \\ Wy \\ Wz \end{bmatrix} \quad \text{[Equation 3]}$$

where the Rx is a red measured luminance in an x-axis direction of the display panel corresponding to the specific grayscale, the Ry is a red measured luminance in a y-axis direction of the display panel corresponding to the specific grayscale, the Rz is a red measured luminance in a z-axis direction of the display panel corresponding to the specific grayscale, the Gx is a green measured luminance in the x-axis direction of the display panel corresponding to the specific grayscale, the Gy is a green measured luminance in the y-axis direction of the display panel corresponding to the specific grayscale, the Gz is a green measured luminance in the z-axis direction of the display panel corresponding to the specific grayscale, the Bx is a blue measured luminance in the x-axis direction of the display panel corresponding to the specific grayscale, the By is a blue measured luminance in the y-axis direction of the display panel corresponding to the specific grayscale, the Bz is a blue measured luminance in the z-axis direction of the display panel corresponding to the specific grayscale, the Wx is a white measured luminance in the x-axis direction of the display panel corresponding to the specific grayscale, the Wy is a white measured luminance in the y-axis direction of the display panel corresponding to the specific grayscale, and the Wz is a white measured luminance in the z-axis direction of the display panel corresponding to the specific grayscale.

6. The display device of claim 1, wherein the gain value includes a first gain value calculated based on a first measured luminance of the display panel corresponding to a first grayscale and a second gain value calculated based on a second measured luminance of the display panel corresponding to a second grayscale higher than the first grayscale, the output grayscale value is generated based on the first gain value in case that the input grayscale value is less than a third grayscale between the first grayscale and the second grayscale, and the output grayscale value is generated based on the second gain value in case that the input grayscale value is greater than or substantially equal to the third grayscale.

7. The display device of claim 1, wherein the gain value includes a first gain value calculated based on a first measured luminance of the display panel corresponding to a first dimming level and a second gain value calculated based on a second measured luminance of the display panel corresponding to a second dimming level higher than the first dimming level, the output grayscale value is generated based on the first gain value in case that a set dimming level of the display panel is less than a third dimming level between the first dimming level and the second dimming level, and the output grayscale value is generated based on the second gain value in case that the set dimming level is greater than or substantially equal to the third dimming level.

8. The display device of claim 1, wherein the gain value includes a first gain value calculated based on a first measured luminance of the display panel corresponding to a first frequency and a second gain value calculated based on a second measured luminance of the display panel corresponding to a second frequency higher than the first frequency, the output grayscale value is generated based on the first gain value in case that a driving frequency of the display panel is less than a third frequency between the first frequency and the second frequency, and the output grayscale value is generated based on the second gain value in case that the driving frequency is greater than or substantially equal to the third frequency.

9. A method of driving a display device that includes a display panel including pixels each displaying one of a red, a green, and a blue, the method comprising:

measuring a measured luminance of the display panel corresponding to a specific grayscale;

calculating a gain value based on the measured luminance;

generating an output grayscale value based on an input grayscale value, a remapped grayscale value corresponding to the input grayscale value, and the gain value; and providing a data signal generated based on the output grayscale value to each of the pixels, wherein the output grayscale value is calculated by Equation 1:

$$\text{GRAY OUT}=\text{GRAY IN}+(\text{GRAY RE}-\text{GRAY IN})\times GV \quad \text{[Equation 1]}$$

where the GRAY_OUT is the output grayscale value, the GRAY IN is the input grayscale value, the GRAY_RE is the remapped grayscale value, and the GV is the gain value, and a grayscale range of the remapped grayscale value is included in a grayscale range of the input grayscale value.

10. The method of claim 9, wherein the gain value includes a red gain value, a green gain value, and a blue gain value, the red gain value is calculated by dividing a red target luminance corresponding to the specific grayscale by a red measured luminance of the display panel corresponding to the specific grayscale, the green gain value is calculated by dividing a green target luminance corresponding to the specific grayscale by a green measured luminance of the display panel corresponding to the specific grayscale, and the blue gain value is calculated by dividing a blue target luminance corresponding to the specific grayscale by a blue measured luminance of the display panel corresponding to the specific grayscale.

11. The method of claim 10, wherein the red targe luminance, the green target luminance, and the blue target luminance are calculated by Equation 2:

$$\begin{bmatrix} TLr \\ TLg \\ TLb \end{bmatrix} = \begin{bmatrix} r/(r+g+b) \\ g/(r+g+b) \\ b/(r+g+b) \end{bmatrix} \times TLw \quad \text{[Equation 2]}$$

where the TLr is the red target luminance, the TLg is the green target luminance, the TLb is the blue target luminance, the r is a red luminance ratio, the g is a green luminance ratio, the b is a blue luminance ratio, and the TLw is a white target luminance.

12. The method of claim 11, wherein the red luminance ratio, the green luminance ratio, and the blue luminance ratio are calculated by Equation 3:

$$\begin{bmatrix} r \\ g \\ b \end{bmatrix} = \begin{bmatrix} Rx & Gx & Bx \\ Ry & Gy & By \\ Rz & Gz & Bz \end{bmatrix}^{-1} \times \begin{bmatrix} Wx \\ Wy \\ Wz \end{bmatrix} \quad \text{[Equation 3]}$$

where the Rx is a red measured luminance in an x-axis direction of the display panel corresponding to the specific grayscale, the Ry is a red measured luminance in a y-axis direction of the display panel corresponding to the specific grayscale, the Rz is a red measured luminance in a z-axis direction of the display panel corresponding to the specific grayscale, the Gx is a green measured luminance in the x-axis direction of the display panel corresponding to the specific grayscale, the Gy is a green measured luminance in the y-axis direction of the display panel corresponding to the specific grayscale, the Gz is a green measured luminance in the z-axis direction of the display panel corresponding to the specific grayscale, the Bx is a blue measured luminance in the x-axis direction of the display panel corresponding to the specific grayscale, the By is a blue measured luminance in the y-axis direction of the display panel corresponding to the specific grayscale, the Bz is a blue measured luminance in the z-axis direction of the display panel corresponding to the specific grayscale, the Wx is a white measured luminance in the x-axis direction of the display panel corresponding to the specific grayscale, the Wy is a white measured luminance in the y-axis direction of the display panel corresponding to the specific grayscale, and the Wz is a white measured luminance in the z-axis direction of the display panel corresponding to the specific grayscale.

13. The method of claim 9, wherein the gain value includes a first gain value calculated based on a first measured luminance of the display panel corresponding to a first grayscale and a second gain value calculated based on a second measured luminance of the display panel corresponding to a second grayscale higher than the first grayscale, the output grayscale value is generated based on the first gain value in case that the input grayscale value is less than a third grayscale between the first grayscale and the second grayscale, and the output grayscale value is generated based on the second gain value in case that the input grayscale value is greater than or substantially equal to the third grayscale.

14. The method of claim 9, wherein the gain value includes a first gain value calculated based on a first measured luminance of the display panel corresponding to a first dimming level and a second gain value calculated based on a second measured luminance of the display panel corresponding to a second dimming level higher than the first dimming level, the output grayscale value is generated based on the first gain value in case that a set dimming level of the display panel is less than a third dimming level between the first dimming level and the second dimming level, and the output grayscale value is generated based on the second gain value in case that the set dimming level is greater than or substantially equal to the third dimming level.

15. The method of claim 9, wherein the gain value includes a first gain value calculated based on a first measured luminance of the display panel corresponding to a first frequency and a second gain value calculated based on a second measured luminance of the display panel corresponding to a second frequency higher than the first frequency, the output grayscale value is generated based on the first gain value in case that a driving frequency of the display panel is less than a third frequency between the first frequency and the second frequency, and the output grayscale value is generated based on the second gain value in case that the driving frequency is greater than or substantially equal to the third frequency.

16. The display device of claim 1, wherein the gain value depends upon the input grayscale value and characteristics of the display device.

17. The display device of claim 1, wherein output grayscale value equals the input grayscale value in case that the input grayscale value exceeds a certain threshold.

18. The method of claim 9, wherein the gain value is calculated by dividing a target luminance corresponding to the specific grayscale by the measured luminance.

* * * * *